(12) United States Patent
Jakubowski, Jr. et al.

(10) Patent No.: US 7,954,765 B2
(45) Date of Patent: Jun. 7, 2011

(54) SYSTEM AND METHOD FOR IN-FLIGHT ADJUSTMENT OF STORE EJECTOR GAS FLOW ORIFICING

(75) Inventors: Thaddeus M. Jakubowski, Jr., Saint Charles, MO (US); Cameron D. Brown, Saint Charles, MO (US); Daniel S. Rymarz, Saint Charles, MO (US); John K. Foster, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 739 days.

(21) Appl. No.: 12/019,615

(22) Filed: Jan. 24, 2008

(65) Prior Publication Data

US 2009/0100996 A1 Apr. 23, 2009

(51) Int. Cl.
*B64D 1/12* (2006.01)
*B64C 19/00* (2006.01)
(52) U.S. Cl. .................. 244/137.4; 244/76 R; 137/625.5
(58) Field of Classification Search ............... 244/137.4, 244/76 R; 294/82.26; 89/1.54, 1.56; 102/382, 102/383, 384; 235/400, 401; 137/625.5
See application file for complete search history.

(56) References Cited

U.S. PATENT DOCUMENTS

| | | | |
|---|---|---|---|
| 4,043,525 A | 8/1977 | Jakubowski | |
| 4,246,472 A * | 1/1981 | Sun et al. | 235/401 |
| 5,029,776 A | 7/1991 | Jakubowski | |
| 5,487,322 A | 1/1996 | Rhodes | |
| 5,583,312 A | 12/1996 | Jakubowski | |
| 5,857,647 A * | 1/1999 | Jakubowski, Jr. | 244/137.4 |
| 6,796,530 B2 | 9/2004 | Jakubowski | |
| 7,147,188 B2 * | 12/2006 | Jakubowski et al. | 244/137.4 |
| 2004/0159739 A1 | 8/2004 | Jakubowski | |
| 2006/0006288 A1 | 1/2006 | Jakubowski | |
| 2007/0164163 A1 | 7/2007 | Jakubowski | |

* cited by examiner

*Primary Examiner* — Joshua J Michener

(57) ABSTRACT

A store ejector is adapted for in-flight adjustment of the pitch attitude imparted to a store by a pair of ejector pistons. The pitch attitude of the store is adjustable to correspond to a flight condition of the aircraft at time of store release. The aircraft has a flight computer that provides store release pitch data corresponding to the aircraft flight conditions. The store ejector includes an orificing assembly that varies the flow of pressurized gas to the ejector pistons by translating a mandrel within a bore formed in the orificing assembly. Orifices within the bore are adjusted to apportion the flow of pressurized gas to the ejector pistons in accordance with an optimum orifice setting corresponding to the desired pitch attitude of the store for the given flight condition.

17 Claims, 7 Drawing Sheets

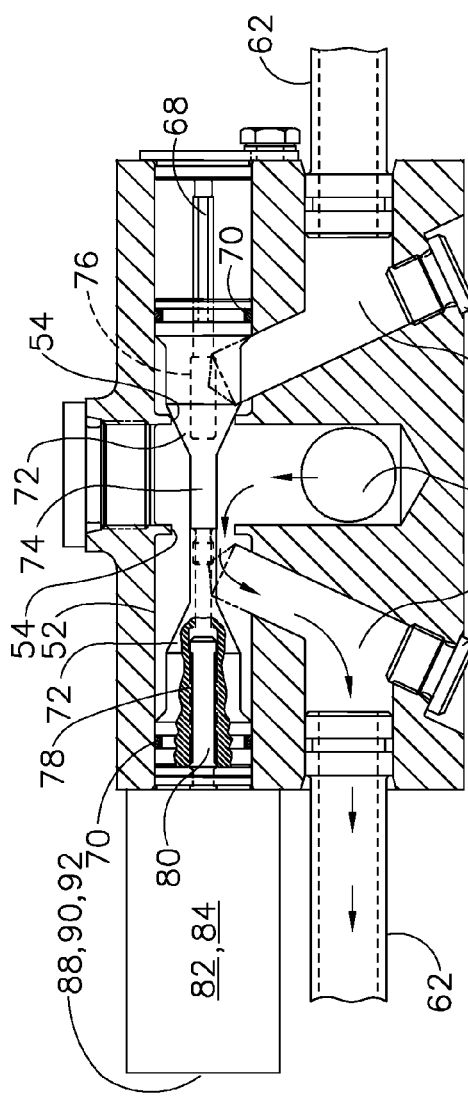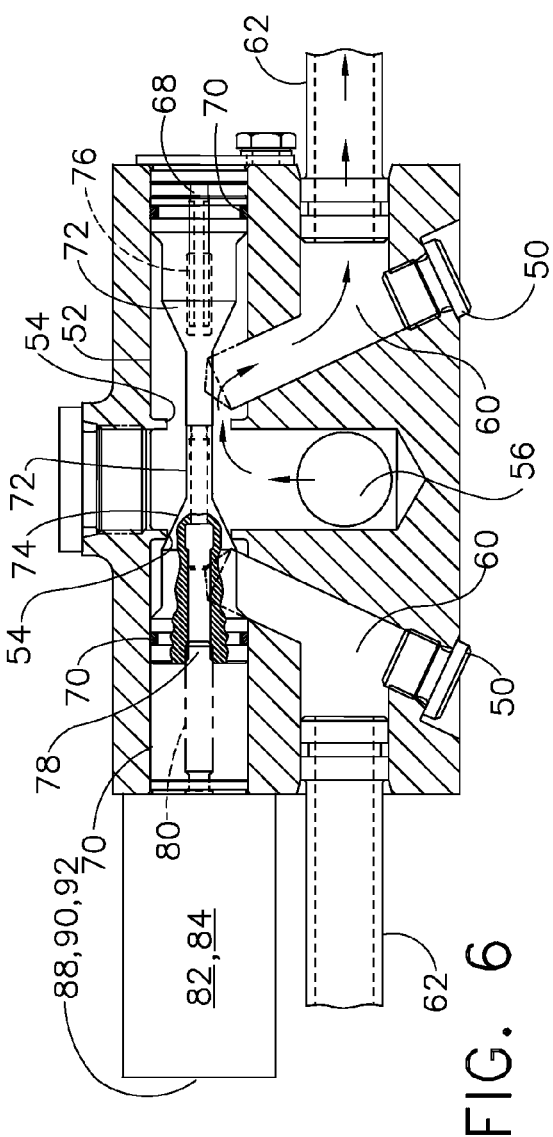
FIG. 5
FIG. 6

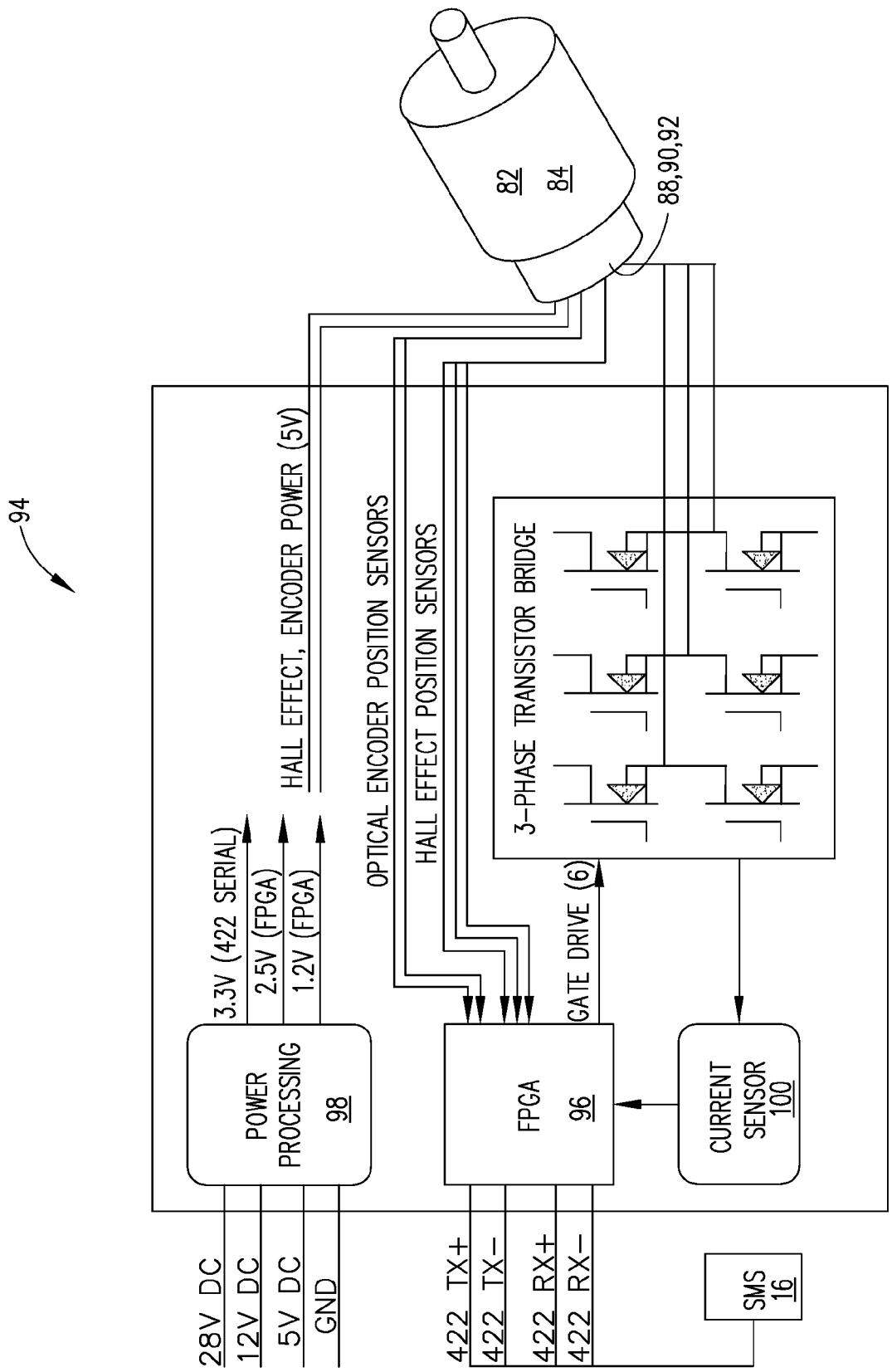

SYSTEM AND METHOD FOR IN-FLIGHT ADJUSTMENT OF STORE EJECTOR GAS FLOW ORIFICING

CROSS-REFERENCE TO RELATED APPLICATIONS

This application is related to U.S. Pat. Nos. 4,043,525 and 5,583,312, the entire contents of each being incorporated by reference herein.

STATEMENT RE: FEDERALLY SPONSORED RESEARCH/DEVELOPMENT (Not Applicable)

FIELD

The present invention relates generally to store ejection systems and, more particularly, to a system and method for in-flight adjustment of an orificing assembly to allow ejection of a store with a desired pitch attitude corresponding to a flight condition of an aircraft.

BACKGROUND

Store ejection systems are commonly used on military aircraft to carry and release stores such as bombs, missiles and other weapons and materials. Such store ejection systems are typically mounted on an underside of the aircraft such as on a wing pylon or in a fuselage bay. Stores are supported from the store ejection system by a pair of suspension hooks.

In order to avoid the risk of collision with the aircraft, the store is typically forcibly ejected away from the airflow surrounding the aircraft after the store is released from the suspension hooks. The store ejection system may include a pair of forward and aft ejector pistons that push the store casing downwardly and away from the aircraft. Compressed fluid such as pressurized gas (e.g., compressed air) is commonly used as the medium for forcing the ejector pistons outwardly to eject the store clear of the aircraft.

In addition to ejecting the store away from the airflow surrounding the aircraft, it is also necessary to eject the store in a controlled manner to avoid problems associated with improper store separation. In the case where the store is a weapon, such problems can result in failure of the weapon to deploy. Improper store separation can also result in tumbling of the store which may compromise the functionality of guidance systems contained within the store and which serve to guide the store to a target. For example, some stores such as missiles carry gyroscopic guidance systems that stabilize the missile during flight and assist in the accurate delivery of the missile toward its target. An ejection of the store that results in a tumbling of the missile may result in the loss of the missile. In extreme cases, improper store separation may result in the store striking the aircraft which can result in loss of aircraft and crew.

In recognition of the need to eject the store away from the aircraft in a controlled manner, some store ejection systems include a means for controlling the pitch of the store upon release. Attempts to control the pitch of the store include varying the amount of ejection force at the forward and aft ejector pistons. For example, in order to produce a nose down pitch of the store, the amount of force produced by the forward ejector piston may be increased accompanied by a decrease in the amount of force produced by the aft ejector piston. The disparity in force required at the forward versus aft ejector pistons has in the past been facilitated through the use of metering devices that apportion the amount of pressurized gas flowing to each of the ejector pistons.

Unfortunately, such metering arrangements are only adjustable on the ground prior to flight and must be set according to the flight condition (e.g., speed, altitude, pitch, acceleration) of the aircraft that is predicted to occur during release of the store. Once airborne, if the actual flight condition at time of store release differs from the predicted flight condition, the store may eject with an improper pitch attitude. As mentioned above, such improper pitch attitude of the store may result in failure of the store (e.g., weapon) to deploy correctly result in loss of the weapon and/or loss of the aircraft should the weapon strike the aircraft.

In light of the increasingly higher speed capabilities of the newer generation of military aircraft, the need for accurate pitch control during store release is more pronounced. Many of these newer aircraft must deliver stores over an increasingly wide range of flight regimes which may include operation of the aircraft in the supersonic range. Due to the increasing variety of flight conditions over which the aircraft operate, it is necessary to impart an accurate pitch attitude to stores that are released such that the stores may safely penetrate the airflow surrounding the aircraft in a controlled manner.

As can be seen, there exists a need in the art for a system and method for adjusting the pitch attitude that is imparted to an ejected store such that the pitch attitude corresponds to the flight condition of the aircraft at time of store release. In addition, there exists a need in the art for a system and method for adjusting the store pitch attitude for a wide range of flight conditions of the aircraft at time of store release. Finally, there exists a need in the art for a system and method for adjusting the pitch attitude that is imparted to an ejected store and which allows for a high degree of accuracy and adjustability.

BRIEF SUMMARY

The present invention specifically addresses the above-described needs associated with store pitch attitude by providing an in-flight adjustable orifice assembly configured to apportion the flow of pressurized gas to forward and aft store ejector pistons according to an actual flight condition of an aircraft such that the ejector pistons forcibly eject the store away from the aircraft at an optimum pitch attitude.

The store ejector may be mounted on an underside of the aircraft such as on a wing pylon or fuselage bay and may include at least one and, more preferably, a pair of suspension hooks for engaging a corresponding pair of lugs mounted on the store. The ejector pistons are preferably provided in pairs and may be located at forward and aft locations on the store ejector. A pneumatically-actuated store release mechanism may be included with the store ejector to disengage the hooks from the lugs while the ejector pistons simultaneously eject or force the released store away from the airflow surrounding the aircraft. A retract mechanism such as a tension spring may be included with each ejector piston for retraction thereof following store launch.

The ejector pistons are also preferably pneumatically actuated by the same pneumatic source that actuates the release mechanism. In one embodiment, the pneumatic source is preferably configured as a cold gas pneumatic system such as an on-board compressor or a replaceable or refillable pressure vessel. However, it is contemplated that the pneumatic source may be configured as a hot gas system utilizing pyrotechnic devices such as pyrotechnic cartridges to provide pressurized gas to the store ejector at the appropriate time.

The pneumatic source (e.g., on-board compressor) may be activated by a store present switch located on the store ejector when the electrical system of the aircraft is powered up. The compressor pressurizes the store ejector and delivers pressurized gas to an accumulator bottle that may be fluidly connected to the orifice assembly. The store present switch may likewise indicate the absence of the store following store launch to signal the deactivation of the pneumatic source and depressurization of the store ejector. A control system electronics (CSE) module of the aircraft may be included to regulate the operation of the pneumatic system and compressor and may further by configured to monitor and maintain the pressurization level of the store ejector and accumulator to within a predetermined range.

The orifice assembly is configured to apportion the flow of pressurized gas to at least one and, more preferably, a pair of the ejector pistons that forcibly eject the store away from the aircraft. In a preferred embodiment, the orifice assembly includes a housing having a bore with a mandrel slidably disposed within the bore. The bore may include at least one inlet port and at least one or, more preferably, a pair of outlet ports corresponding to the same quantity of ejector pistons employed on the store ejector. The inlet port receives pressurized gas from the accumulator following activation of a dump valve located between the accumulator and the orifice assembly in one embodiment.

The bore preferably includes a spaced pair of annular orifices disposed on opposite sides of the inlet port. The mandrel includes a pair of tapered portions that cooperate with the pair of orifices to define a pair of variable annular flow areas at each orifice. Axial translation of the mandrel within the bore alters the annular flow areas at each orifice causing variations in the ratio of pressurized gas flowing into the outlet ports. Each one of the outlet ports is connected to an ejector piston by an ejector piston conduit. The outlet ports preferably extend from the bore at an acute angle in order to minimize energy losses otherwise occurring as a result of sharp turns in the flow path of the pressurized gas.

The orifice assembly includes a drive mechanism in one embodiment for translating the mandrel axially within the bore. The drive mechanism may be configured as a servo-motor mountable on the housing and operatively coupled to the mandrel such as by means of a threaded shaft enagageable to a threaded bore formed in one end of the mandrel. An opposite end of the mandrel may include an anti-rotation mechanism of any suitable configuration such as a hex shaft slidably enagageable into a hex bore formed in an opposite end of the mandrel. In such an arrangement, the mandrel may be screw-driven by the servo-motor. The geometry of the tapered portions relative to the geometry of the orifice may be configured to provide a relatively high degree of accuracy and infinite adjustability for the apportionment of gas flow.

A variable pitch valve controller (VPVC) may be included with the store ejector for regulating the servo-motor in positioning the mandrel within the bore. The servo-motor is preferably configured as a three-phase brushless DC motor due to its favorably high energy density and long operating life although a variety of alternative motor configurations may be used. Redundant position sensors such as Hall effect sensors and/or an optical encoder and/or a resolver (i.e., a rotary transformer) may be included with the servo-motor for mandrel position calibration and verification prior to store launch. In addition, the position of the mandrel may be determined using sensorless control wherein the back EMF of the non-driven motor windings is monitored and the shaft position of the servo-motor is inferred from the voltage shape and magnitude.

Advantageously, the technical effects of the invention include the in-flight adjustability of the orifice assembly as an improvement over conventional ground-adjustable orificing arrangements which are limited in the range of flight conditions during which a store may be safely ejected. For example, if the flight regime of the aircraft varies from that which is planned during ground adjustment operations of an orificing assembly, the orifice settings may be sub-optimal for the actual flight conditions at time of store release. Such improper orifice setting may compromise the ability to safely eject the store and can result in improper pitch attitude imparted to the release store causing poor store separation and failure of the store (e.g., weapon) to safely deploy and loss of the weapon. As mentioned above, in extreme cases, improper pitch attitude imparted to the released store may result in improper separation from the aircraft causing the store to strike and damage the aircraft with the potential for loss of aircraft.

Advantageously, the orifice settings in one embodiment of the present invention are based on actual flight conditions obtained in real-time (i.e., at time of store launch) or near real-time (i.e., immediately prior to store launch) such as from the aircraft flight computer. The flight conditions upon which the orifice settings may be based include, but are not limited to, the flight attitude of the aircraft such as pitch, yaw, roll and linear acceleration and/or velocity, altitude and various other flight parameters and environmental parameters within which the aircraft is operating.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

The features of the present invention will become more apparent upon reference of the drawings wherein like numerals refer to like parts there throughout and in which:

FIG. 5 is a sectional illustration of an embodiment of the orifice assembly wherein the mandrel is positioned such that an aft orifice is closed;

FIG. 6 is a sectional illustration of an embodiment of the orifice assembly wherein the mandrel is positioned such that a forward orifice is closed;

FIG. 8 is a schematic diagram of an embodiment of a pneumatic system for providing pressurized gas to the orifice assembly.

DETAILED DESCRIPTION

Figure 1:
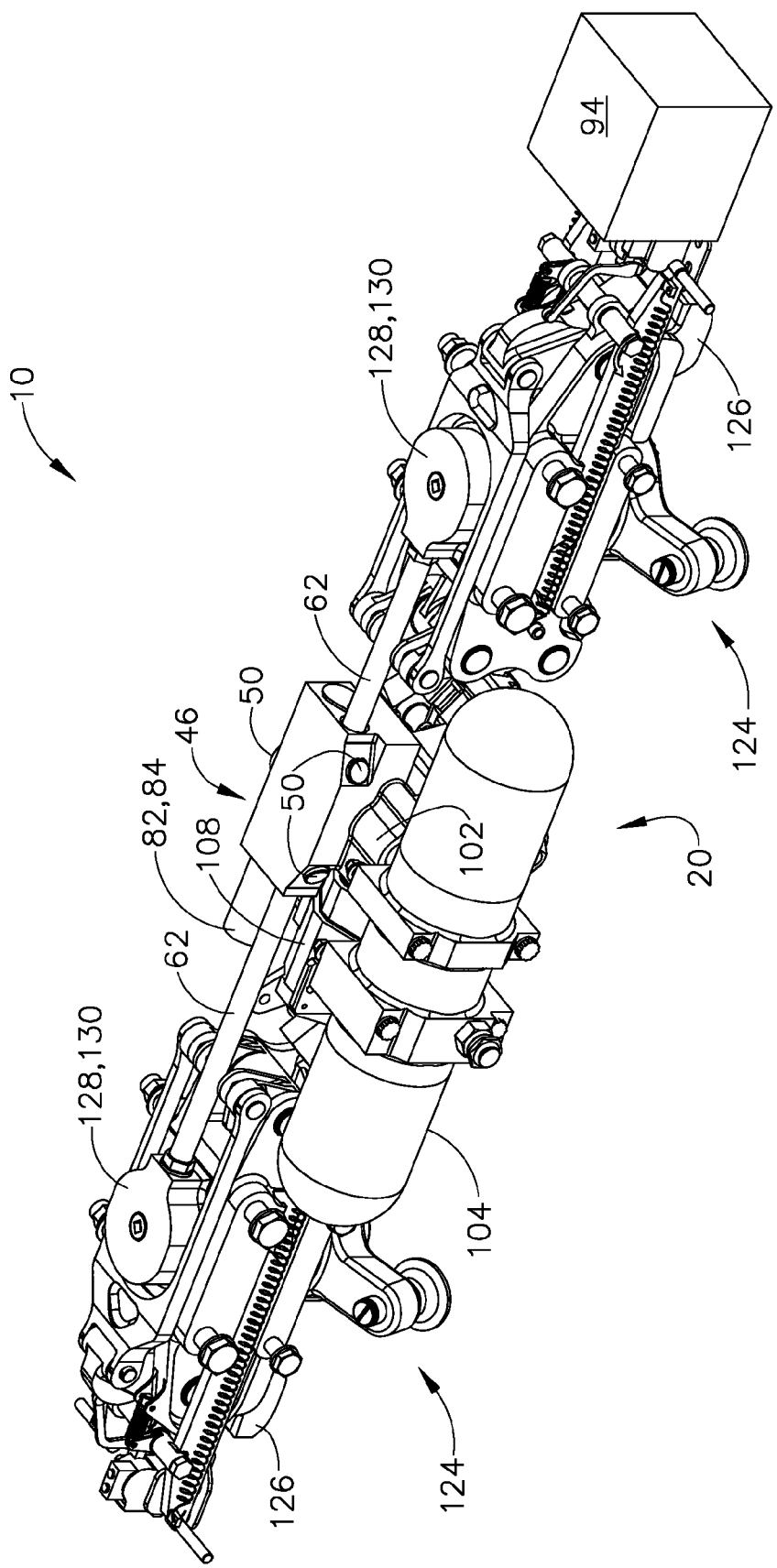
FIG. 1 is a perspective illustration of an embodiment of a store ejector having a variable gas orifice assembly.

Referring now to the drawings wherein the showings are for purposes of illustrating preferred and various embodiments of the invention only and not for purposes of limiting the same, FIG. 1 is a perspective illustration of a store ejector 10 such as may be mounted on an aircraft and wherein the store ejector 10 may include an in-flight adjustable orifice assembly 46 and a VPVC 94. At the time of store 12 launch, the VPVC 94 receives information such as store release pitch data from a flight computer 14 regarding a desired or optimum pitch attitude or setting of the store 12 corresponding to the current aircraft flight condition. Accordingly, the VPVC 94 adjusts the orifice assembly 46 in order to apportion the flow of pressurized fluid (e.g., gas) to forward and aft ejector pistons 130. The forward and aft ejector pistons 130 cooperate to forcibly eject the store 12 away from the aircraft at the optimum pitch attitude.

The store ejector 10 such as that which is shown in FIG. 1 may be adapted to be mounted on the aircraft such as on an underside of a wing or fuselage or on a wing pylon or other support structure. However, it should be noted that the store ejector 10 may be adapted to be mounted and operated on a variety of alternative structures or vehicles where forcible ejection of stores is required. The store ejector 10 may include at least one and, more preferably, a pair of hooks 126 adapted to releasably engage a mating pair of lugs (not shown) mounted on the store 12.

As shown in FIG. 1, the store ejector 10 may be fitted with two pairs of hooks 126 having different spacings and support capabilities. As used herein, the store 12 may be configured as an article, object and/or material that is supported or carried by the store ejector 10 for subsequent release and ejection. For example, the store 12 may be configured as a weapon such as a bomb or missile or other munitions-bearing object although the store 12 may be configured as a non-weapon or non-munitions bearing object.

Figure 2:
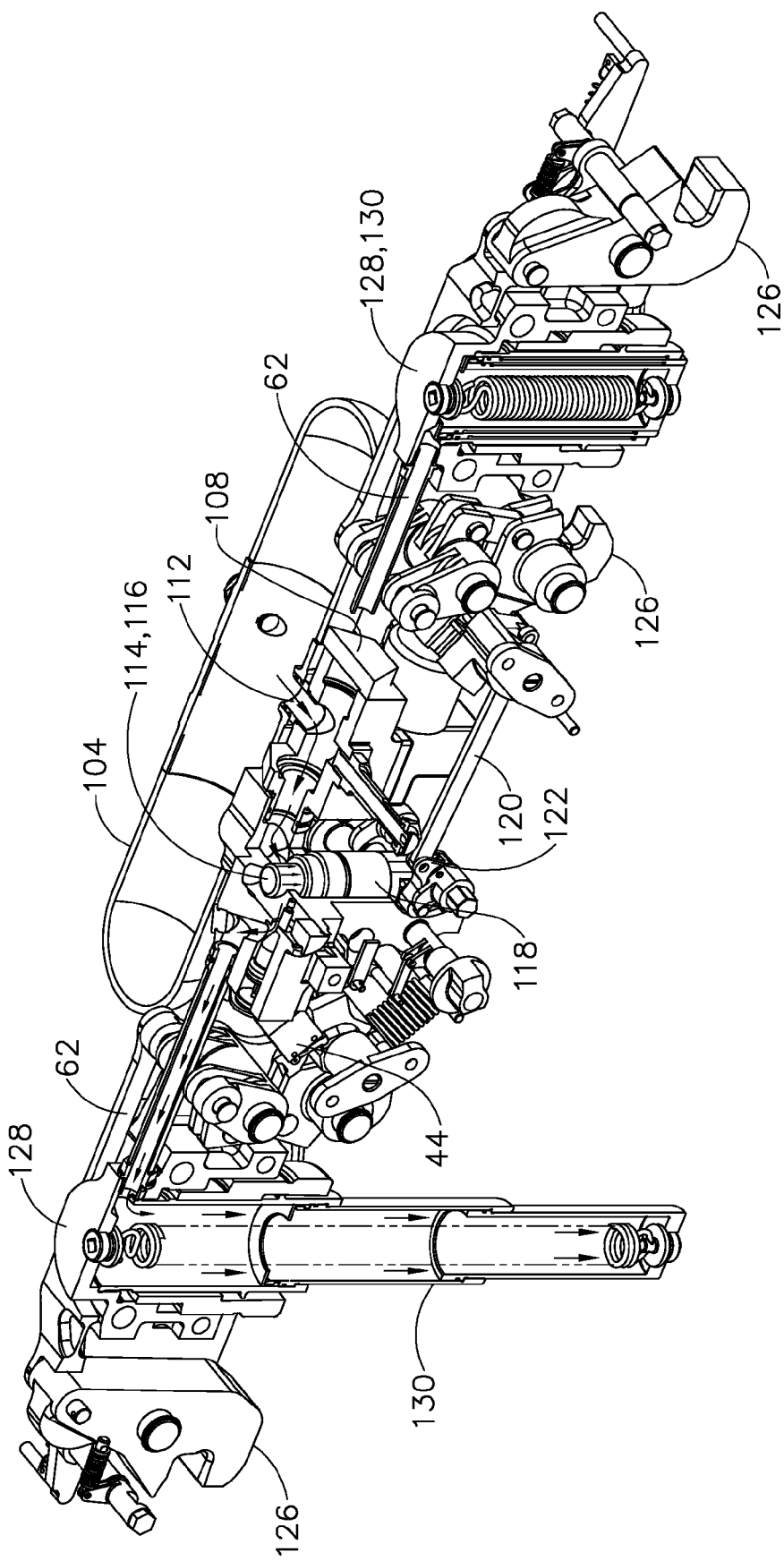
FIG. 2 is a cutaway perspective illustration of an embodiment of the store ejector of FIG. 1 and further illustrating an accumulator for providing pressurized gas to the orifice assembly for subsequent delivery to a pair of ejector pistons, one of which is shown fully extended.

Referring to FIGS. 1 and 2, the store ejector 10 may include a pair of piston assemblies 128 for housing 48 the pair of ejector pistons 130 and which may be located at forward and aft ends of the store ejector 10. As was mentioned above, the ejector pistons 130 are configured to forcibly eject the store 12 away from the aircraft after the hooks 126 are disengaged from the store lugs by a release mechanism 114 best seen in FIGS. 2 and 3. FIG. 2 illustrates one of the ejector pistons 130 in a fully extended position while the ejector piston 130 on the opposite end of the store ejector 10 is shown in a fully retracted position. The extended ejector piston 130 is shown as comprising a plurality of telescopic portions that extend when acted upon by pressurized fluid (e.g., gas) entering the ejector piston.

A biasing element(s) such as a tension spring may be included in the piston assembly 128 to retract the telescopic portions when the pressurized fluid is withdrawn or when the ejector piston 130 is depressurized. Although a pair of ejector pistons 130 is shown, any number may be provided including a single ejector piston 130 or more than two (2) ejector pistons 130 and the same may be operated in the manner described herein. Furthermore, the ejector pistons 130 are not limited to the telescopic configuration shown but may encompass non-telescopic configurations.

FIG. 1 further illustrates a set of sway braces 124 that may be included with the store ejector 10 and which may be positioned in pairs on opposite sides of each piston assembly 128 at each of forward and aft ends of the store ejector 10 for stabilizing the store 12 prior to launch. The store ejector 10 may also include at least one store present switch 44 which may be preferably located adjacent one of the hooks 126 as shown in FIG. 1. Also shown as part of the schematic diagram of FIG. 7 and as will be described in greater detail below, the store present switch 44 is preferably configured to indicate the presence of a store 12 during store loading or the absence of the store 12 following launch in accordance with the operation of the store ejector 10.

Figure 7:
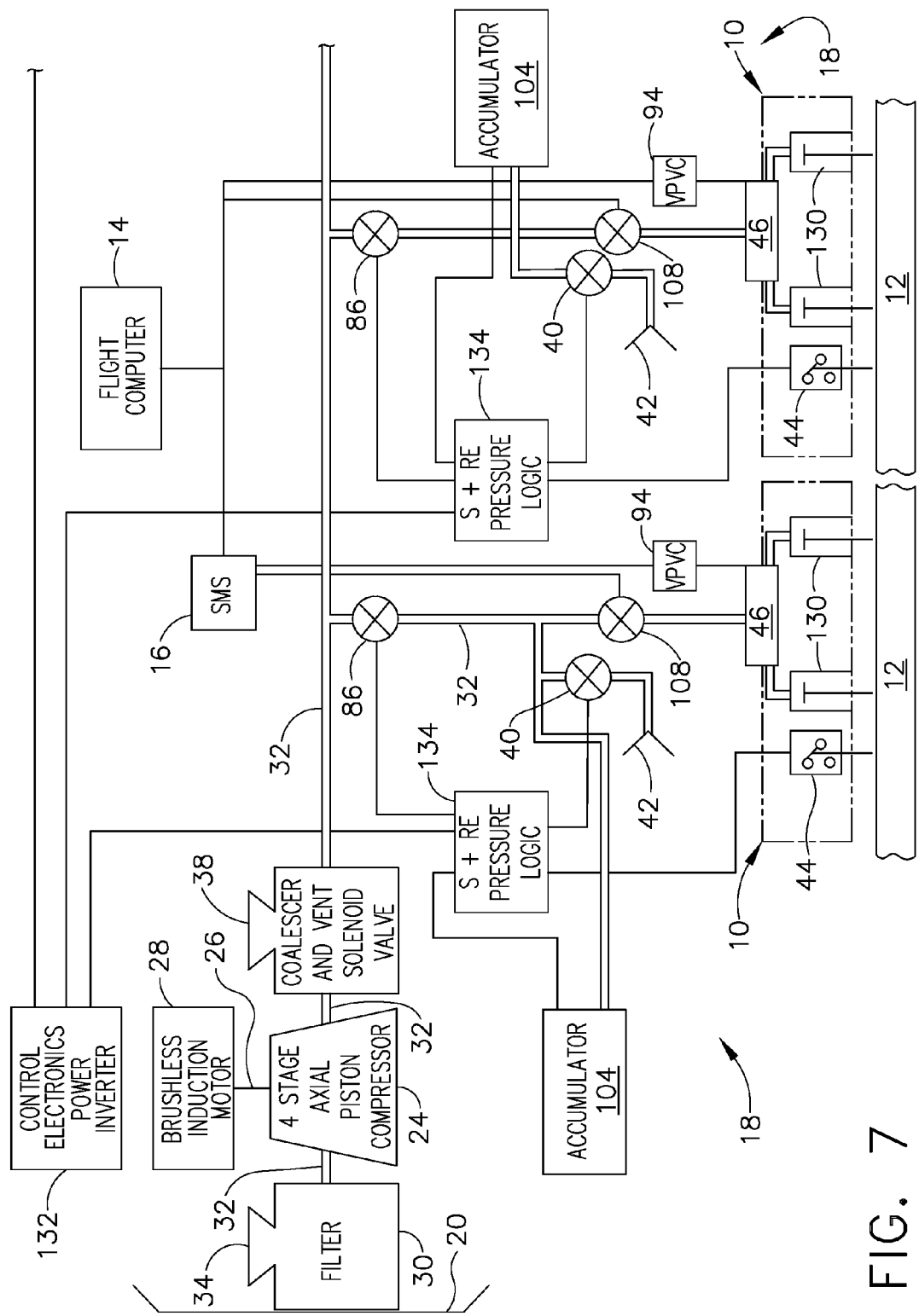
FIG. 7 is a schematic diagram of an embodiment of a variable pitch valve controller.

Also illustrated in the schematic diagram of FIG. 7 is a module for containing the control system electronics 132 (CSE) of the store ejector 10. In a preferred embodiment, the CSE 132 may be located onboard the aircraft. As will be described in greater detail below, the CSE 132 controls the operation of a pneumatic source 20 of pressurized fluid or gas for the store ejector 10 in an exemplary pneumatic store ejection system similar to that which is disclosed in commonly-owned U.S. Pat. No. 5,583,312, the entire contents of which is incorporated by reference herein.

It should be noted that although the present description is with reference to a pneumatic system using pressurized gas, alternative types of pressurized fluid medium may be used such as hydraulic fluid. However, due to the greater metering accuracy available with pressurized gas, a pneumatic source 20 is preferred and may include the use of any suitable gas including, but not limited to, air, nitrogen, argon, helium, and other preferably non-volatile gases. Furthermore, although the present invention is described with reference to a cold gas system utilizing an on-board compressor 24 or replaceable or refillable pressure vessels (i.e., gas bottles), the pneumatic source 20 may also be a hot gas system using pyrotechnic devices such as pyrotechnic cartridges to generate the pressurized gas.

Upon engagement of the hooks 126 during loading of a store 12 onto the store ejector 10, the store present switch 44 sends a signal to the CSE 132 causing the CSE 132 to command the pneumatic source 20, such as a compressor 24 or other pressurization source (e.g., pressure vessel or gas bottle) to pressurize the store ejector 10 system. In one embodiment, the pneumatic source 20 or system may include an accumulator bottle 104, best seen in FIG. 1 as a hollow member disposed along one side of the store ejector 10. The accumulator bottle 104 may be pressurized by the compressor 24. Upon reaching a desired pressurization level, the CSE 132 may command the compressor 24 to cease pressurization. However, the CSE 132 may also continuously monitor the pressurization level and transmit appropriate commands to maintain the pressurization level within a desired range.

Figure 3:
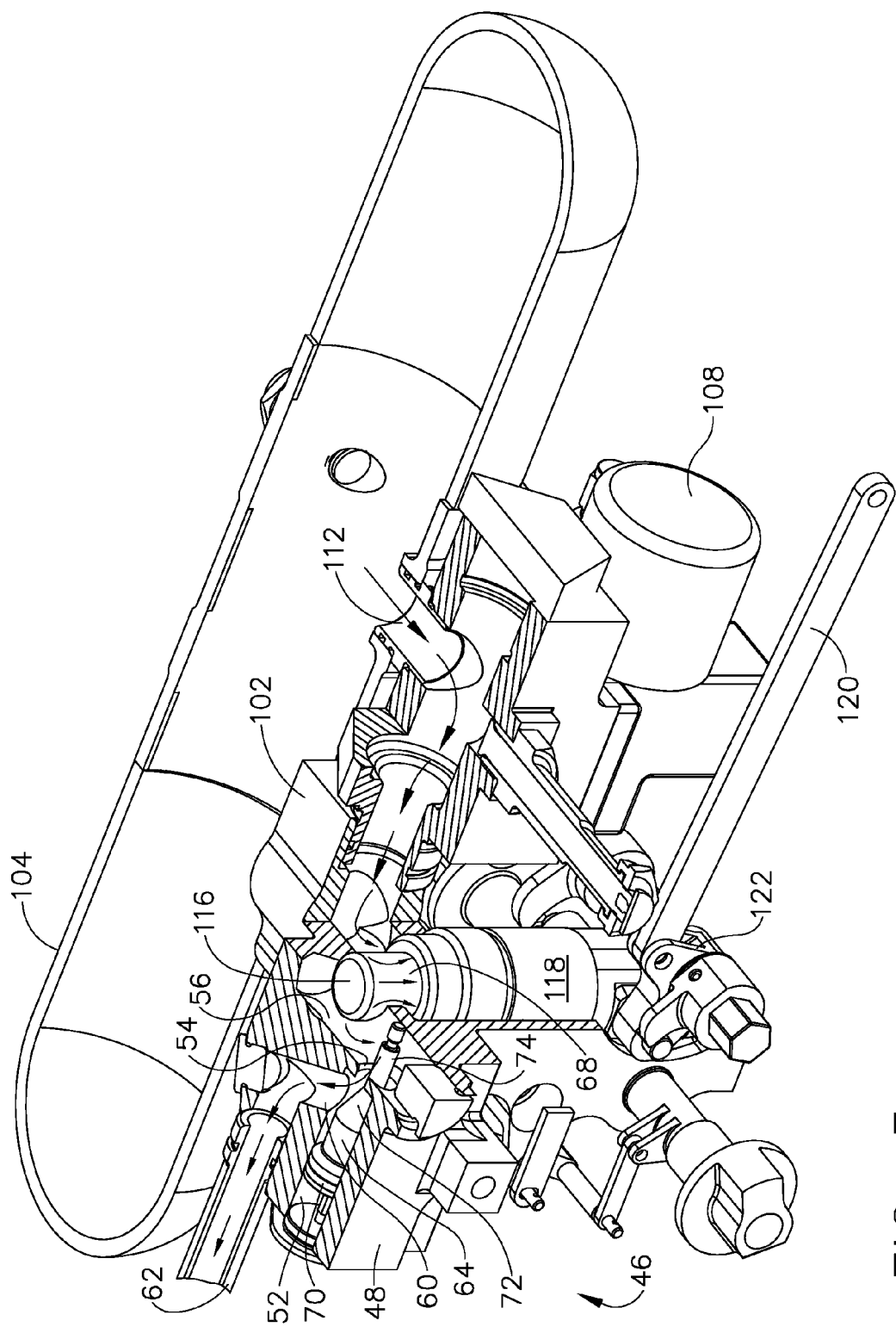
FIG. 3 is a cutaway perspective illustration of an embodiment of the orifice assembly having a release piston and further illustrating the flow of pressurized gas from the accumulator through the orifice assembly and into one of the exit ports.

Referring to FIG. 3, shown is a partial cutaway view of the orifice assembly 46 portion of the store ejector 10 and illustrating its interconnection to the accumulator bottle 104 in one embodiment. As was indicated above, the orifice assembly 46 apportions the flow of pressurized fluid (e.g., gas) from the accumulator bottle 104 to the forward and aft ejector pistons 130 to forcibly eject the store 12 away from the aircraft at the optimum pitch attitude. In one embodiment, the accumulator bottle 104 may also be configured to activate the hook release mechanism 114, shown in FIG. 3 as a release piston 116 that is reciprocative within a housing 48 of the orifice assembly 46.

The release mechanism 114 may be mechanically linked to each of the hooks 126 such as by means of a set of release cranks 122 and release rods 120 that may extend from each release crank 122 to a complementary set of cranks at the hooks 126. In the embodiment shown in FIG. 3, the release piston 116 is reciprocatively disposed within the housing 48 and is driven downwardly upon entry of pressurized gas into a piston chamber 68 of the housing 48.

As best seen in FIG. 3, the pressurized gas flows from an accumulator outlet port 112 of the accumulator bottle 104 upon the opening of a solenoid-activated dump valve 108. The dump valve 108 may be connected to the orifice assembly 46 by a coupler manifold 102 although other arrangements for fluidly connecting the accumulator to the orifice assembly 46 are contemplated. For example, the dump valve 108 may be arranged to directly interconnect the accumulator bottle 104 to the orifice assembly 46.

Regardless of the interconnection arrangement, when pressurized gas initially flows into the orifice assembly 46, the release piston 116 is forced downwardly into a sleeve guide 118 (e.g., cylinder) causing the release cranks 122 to pivot. The pivoting release cranks 122 cause the release rods 120 to translate resulting in disengagement of the hooks 126 and release of the store 12. In this regard, the exemplary release mechanism 114 disclosed herein is similar to that which is disclosed in commonly-owned U.S. Pat. No. 4,043,525, the entire contents of which is incorporated by reference herein.

Although FIGS. 2 and 3 illustrate a specific arrangement of the release mechanism 114 in the form of the release piston 116 and its related components (e.g., release cranks 122, release rods 120), it should be recognized that the release mechanism 114 may be configured in a wide variety of alternative arrangements other than the pneumatically-driven mechanical linkage shown and described. For example, it is contemplated that the release mechanism 114 may be provided in an electronically-activated or solenoid-activated arrangement or by using non-mechanical means for disengaging the hooks 126 from the store 12. Furthermore, the release mechanism 114 may be non-pneumatically activated and may be configured as a separate system from the orifice assembly 46.

Figure 4:
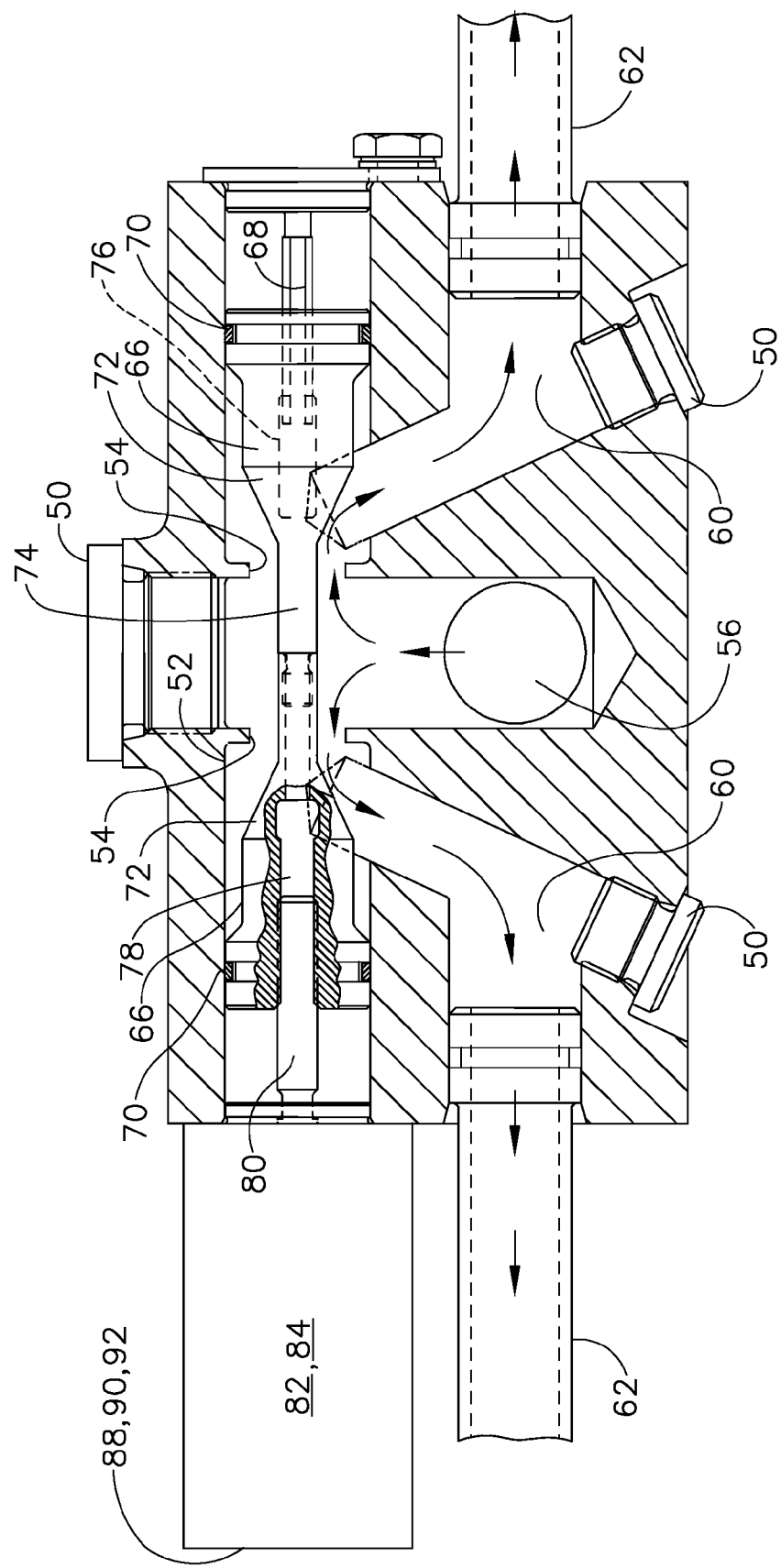
FIG. 4 is a sectional illustration of an embodiment of the orifice assembly having a mandrel slidably disposed in a neutral position to allow equal apportioning of gas flow through the exit ports.

Referring to FIGS. 3-4, shown is the adjustable orifice assembly 46 which, in an exemplary embodiment, may be comprised of the housing 48 which may have an elongate mandrel bore 52 formed therein. As best seen in FIG. 4, the housing 48 may include at least one inlet port 56 and a pair of outlet ports 60, each of which is in fluid communication with the mandrel bore 52. The inlet port 56 is configured to allow pressurized gas to enter the mandrel bore 52 after the release piston 116 is forced downwardly by the entering pressurized gas as best seen in FIG. 3. The housing 48 is shown as being generally symmetrical configured about an axis of the inlet port 56 and which may improve flow characteristics through the orifice assembly 46. However, it should be noted that asymmetric arrangements of the housing 48 are contemplated.

Referring to FIGS. 4-6, the mandrel bore 52 preferably includes a pair of annular orifices 54 that are disposed in spaced relation to one another and which are preferably coaxially aligned with the bore 52. The bore 52 is sized and configured to be complementary to a mandrel 64 slidably disposable within the bore 52 and being axially translatable. As will be described in greater detail below, translation of the mandrel 64 within the bore 52 alters the ratio of pressurized gas flow from the outlet ports 60 into the ejector pistons 130. In one embodiment, the mandrel 64 may be configured with a pair of tapered portions 72 that are interconnected by a necked portion 74 as shown. The necked portion 74 is shown as being generally of constant cylindrical cross section although the necked portion 74 may be provided in a wide variety of shapes and sizes.

Each one of the tapered portions 72 is configured to cooperate with an adjacent one of the orifices 54. In the arrangement shown, the tapered portions 72 of the mandrel 64 are disposed on an outer side of an adjacent-most one of the orifices 54. However, it is contemplated that the mandrel 64 may be configured such that each one of the tapered portions 72 is positioned on an inner side of an adjacent-most one of the orifices 54 in an arrangement similar to that which is disclosed in the above-referenced U.S. Pat. No. 4,043,525. The mandrel 64 may be formed as a unitary structure encompassing the tapered portions 72 and the necked portion 74. However, a preferred embodiment of the mandrel 64 includes a pair of mandrel portions 66 each comprising a tapered portion 72 and a segment of the necked portion 74 and wherein the mandrel portions 66 are configured to be enagageable to one another such as by threaded engagement along the necked portion 74 as shown in FIG. 4.

As can be seen in FIGS. 4-6, each of the tapered portions 72 and its adjacent orifice 54 collectively define an orifice setting or aperture through which pressurized gas may flow in a metered amount depending upon the mandrel 64 position. More specifically, the mandrel 64 is axially translatable such that the tapered portions 72 are movable relative to the orifices 54 to alter the ratio of pressurized gas flow into the outlet ports 60. The ratio is altered as a result of changes in the annular flow area through the orifices 54 as the tapered portions 72 move closer and further from the orifices 54. For example, as shown in FIG. 4, the mandrel 64 is in a neutral position resulting in an equal distribution of pressurized gas flow into the outlet ports 60. However, in FIG. 5, the mandrel 64 is positioned such that the forward or right-most orifice 54 is blocked forcing the pressurized gas to flow only into the left-most outlet port 60. Conversely, FIG. 6 shows the mandrel 64 being positioned such that the left-most orifice 54 is blocked forcing the pressurized gas to flow only into the forward or right-most outlet port 60.

Each one of the outlet ports 60 is connected to a corresponding ejector piston 130 via an ejector piston conduit 62 as shown in FIG. 4 and which are also illustrated in FIGS. 1 and 2. Selective positioning of the mandrel 64 between the extremes shown in FIGS. 5 and 6 allows for an infinitely adjustable apportionment of gas flow into the left and right outlet ports 60 and to the corresponding ejector pistons 130. A pressure seal 70 may preferably be included on each end of the mandrel 64 to prevent the escape of pressurized gas.

As can be seen in FIG. 3, the inlet and outlet ports 56, 60 may be formed as blind bores as part of a conventional machining process and therefore requiring caps 50 on each of the ports for sealing purposes. However, it is contemplated that the housing 48 may be formed using alternative manufacturing practices such as laser sintering of powdered metal and therefore eliminating the formation of blind holes requiring caps 50. Regarding the outlet ports 60, it can be seen that an acute angle is formed between each outlet port 60 and the bore 52 in an exemplary embodiment. The acute angles formed between each outlet port 60 and the bore 52 is believed to be advantageous in promoting smooth flow and minimizing energy losses in the flow of pressurized gas out of the housing 48 and into the ejector piston conduits 62.

Referring still to FIGS. 4-6, the orifice assembly 46 may include a drive mechanism 82 to facilitate axial translation of the mandrel 64 within the bore 52. Although the drive mechanism 82 may be provided in any number of alternative embodiments, in one embodiment, the drive mechanism 82 may comprise a servo-motor 84 that may be mounted on the housing 48 and which is operatively coupled to the mandrel 64. One end of the mandrel 64 may include a threaded bore 78 to engage a threaded shaft 80 coupled to the servo-motor 84.

An opposite end of the mandrel 64 can be seen as having a hex bore 76 within which a hex shaft 68 is non-rotatably slidably fixed. The hex shaft 68 may preferably be fixedly secured to the housing 48 as shown in FIG. 3 as a means to prevent rotation of the mandrel 64 during rotation of the threaded shaft 80. In such an arrangement, rotation of the servo-motor 84 results in the mandrel 64 being screw-driven axially within the bore 52. As was mentioned above, axial movement of the mandrel 64 alters the flow area between the orifices 54 and the tapered portion 72 or necked portion 74.

The geometry of the mandrel 64 in relation to the orifice 54 spacing and configuration may be such that a predetermined number of revolutions of the threaded shaft 80 are required for the mandrel 64 to translate from the neutral position shown in FIG. 4 to one of the closed positions illustrated in FIGS. 5 and 6. In an exemplary embodiment, the mandrel 64 and orifice 54 geometry and thread pitch of the threaded shaft 80 is such that twelve (12) full revolutions of the threaded shaft 80 may be required for the mandrel 64 to translate from the neutral position shown in FIG. 4 to one of the closed positions shown in FIG. 5 or 6. Preferably, but optionally, the geometry of the mandrel 64 relative to the orifices 54 may be such that two full revolutions of the threaded shaft 80 are required to translate the mandrel 64 out of the neutral zone within which the orifices 54 are axially aligned with the necked portion 74.

As the servo-motor 84 rotates the threaded shaft 80, the axial movement of the mandrel 64 progressively reduces the orifice 54 exit area defined between the tapered portion 72 and the orifice 54 toward which the tapered portion 72 is moving. Simultaneously, the orifice 54 exit area adjacent the opposite orifice 54 remains constant because that orifice 54 exit area is defined between the orifice 54 and the constant-section necked portion 74. Although the above-described twelve (12) turn embodiment provides a high degree of accuracy and adjustability, the geometry of the mandrel 64 relative to the orifices 54 may be varied such as by increasing the thread pitch of the threaded shaft 80 to further increase the accuracy and the adjustability of the orifice assembly 46.

Referring now to FIG. 8, shown is a schematic diagram of a variable pitch valve controller 94 (VPVC) as may be employed for positioning the mandrel 64 within the bore 52. The VPVC 94 may be mounted on the store ejector 10 adjacent one end thereof as shown in FIG. 1 although various other locations are contemplated. As indicated above, the mandrel 64 is translated by means of a drive mechanism 82 which, in the exemplary embodiment described herein, may be a servo-motor 84 configured to screw-drive the mandrel 64. In this regard, the servo-motor 84 rotates the threaded shaft 80 a desired number of revolutions in order to translate the mandrel 64 to achieve a desired orifice 54 setting of the annular orifices 54 relative to the tapered portions 72. The servo-motor 84 is preferably configured as a three-phase brushless D.C. motor due to its favorable high power density, high speed capability and long operating life.

The VPVC 94 preferably, but optionally, includes a means for sensing the position of the mandrel in the bore wherein the sensing means is in communication with the valve controller. In an embodiment, the means for sensing the mandrel position may be by sensorless control wherein the back EMF of the non-driven motor windings of the servo-motor are monitored and the shaft position of the servo-motor is inferred from the voltage shape and magnitude. In another embodiment, the means for sensing the position of the mandrel may be a position sensor 88 such as a resolver (i.e., a rotary transformer) that may be included with the servo-motor for mandrel position calibration and verification prior to store launch.

The position sensor 88 may comprise a variety of different types of position sensors 88 with preferred embodiments including an optical encoder 92 and/or Hall effect sensors 90 or the above-mentioned resolver configured to sense the number of revolutions of the servo-motor 84 for feedback to the VPVC 94. As is known in the art, Hall effect sensors 90 are magnetically sensitive and are configured to produce a magnetic pulse when a rotor magnet rotates past the sensor 90. The pulses are transmitted to the VPVC 94 and provide an indication of the rotational or angular position of the threaded shaft 80. In addition, the pulses also allow the VPVC 94 to excite the appropriate number of windings of the servo-motor 84 to produce the desired rotational movement. The optical encoder 92 may also transmit signals to the controller representative of the angular position of the threaded shaft 80 in order to provide redundancy and to increase the feedback resolution. As shown in FIG. 8, the optical encoder 92 may be mounted on an aft end of a shaft 26 of the servo-motor 84 although alternative locations are contemplated.

The configuration of the VPVC 94 may include a field programmable gate array 96 (FPGA 96) logic device although other suitable logic devices may be used. As was indicated above, the FPGA 96 receives position signals from the position sensor 88 (i.e., Hall effect sensors 90, optical encoder 92) and determines the appropriate number of windings to excite in the servo-motor 84 in order to produce the desired rotational movement of the threaded shaft 80. The VPVC 94 also monitors the servo-motor 84 current via a current sensor 100 and protects against over-current damage to the servo-motor 84 or VPVC 94.

Referring still to FIG. 8, regarding commands to the servo-motor 84 for positioning the mandrel 64, the VPVC 94 also receives signals such as via a serial communication bus (RS-422) from a stores management system 16 (SMS) which, in turn, receives information regarding the flight condition of the aircraft at the time of store launch. The VPVC 94 may preferably be configured to operate in closed loop control for improved accuracy in commanding the servo-motor 84 to translate the mandrel 64 to the desired position. As can be seen in FIG. 8, the VPVC 94 includes a power processor 98 which receives regulated power at positive +12V dc and +5V dc which is used for bias power for regulating logic devices of the VPVC 94. The power processor 98 also provides 28V dc power to the servo-motor 84 as is used to power the VPVC 94 and which is limited to 35V dc. In addition, the 28V dc power is filtered for electromagnet interference (EMI) externally to the VPVC 94.

Referring now to FIG. 7, the exemplary pneumatic system as may be utilized with the store ejector 10 is shown as including a pair of suspension and release equipment 18 (SRE 18) modules which are preferably mounted aboard the aircraft. Each SRE 18 module is interconnected to one of the store ejectors 10 described above and may be configured as substantially similar if not identical assemblies. As shown in FIG. 7, each SRE 18 module may include the accumulator bottle 104, an SRE 18 pressure logic controller, an enabler valve 86, a dump valve 108, an over-pressure valve 40, and an over-pressure vent 42. Each pneumatic source 20 included in each of the SRE 18 modules may include an air vent 34 to filter ambient air. An on-board compressor 24 of any suitable type may be included and may be driven by a suitable compressor motor 28 connected to the compressor 24 by a shaft 26 and which is controlled by the CSE 132 described above. Pressurized air produced by the compressor 24 is delivered through flow passage 32 to a coalescer 36 and vent solenoid valve to dry the pressurized gas (i.e., air). Moisture within the pressurized air is vented through a moisture vent 38 prior to delivery to each of the SRE's 18. The above description is exemplary and is similar to that which is disclosed in the above-mentioned U.S. Pat. No. 5,583,312.

The methods of operation of the store ejector 10 will now be described with reference to FIGS. 1-8. The store ejector 10 is initially in an unpressurized state prior to store 12 loading. As mentioned above, the store present switch 44 indicates the presence of a store during store 12 loading when the hooks 126 of the store ejector 10 engage the mounting lugs of a store 12. When the aircraft electrical system is powered up, the store present switch 44 causes the CSE 132 to activate the compressor 24 (or other pneumatic source 20) initiating pressurization and causing pressurized gas to be delivered to the accumulator bottle 104. Upon reaching a desired pressurization level, the CSE 132 may deactivate the compressor 24. However, in order to maintain the pressurization level within a desired range, the CSE 132 may continuously monitor the pressurization level and transmit appropriate commands to the compressor 24 if pressure decreases or to the over-pressure valve 40 and over-pressure vent 42 if pressure increases such as a result of heat soak.

In one embodiment of the invention, the store present switch 44 signal may be transmitted to the aircraft SMS 16 causing the SMS 16 to query the aircraft flight computer 14 regarding the flight conditions of the aircraft. Alternatively, the store ejector 10 may include its own set of sensors to generate data regarding the flight condition of the aircraft upon prompting by the store present switch 44. Such flight condition data may include, but is not limited to, the flight attitude of the aircraft (e.g., pitch, roll, yaw, linear-acceleration and/or velocity) as well as altitude, relative ground speed, and various other flight conditions of the aircraft and environment in which it is operating.

The SMS 16 may be preprogrammed with a computer program or set of algorithms for determining a set of store separation pitch requirements based on aircraft type for a variety of flight conditions. Because the pitch requirements for safe ejection of a store 12 are dependent upon the aircraft type (i.e., the aircraft structural, functional and operating characteristics), such store separation pitch requirements may be empirically derived by the aircraft or airframe manufacturer or in conjunction therewith. For example, the aircraft manufacturer may specify the pitch settings (e.g., pitch rate, acceleration, angle) required for safe separation of different stores followed by empirical development of the required optimum orifice 54 setting in the orifice assembly 46 to achieve the pitch setting.

For the exemplary embodiment of the orifice assembly 46 described herein and for a given pitch setting, the number of revolutions of the servo-motor 84 required to axially position the mandrel 64 may be empirically developed. It may also be necessary to develop the servo-motor 84 settings (i.e., the orifice settings) for the same type of store 12 and same aircraft if the store ejector 10 is mounted on different locations of the aircraft such as on an outboard wing pylon versus an inboard wing pylon, etc.

When the SMS 16 queries the flight computer 14 (or other sensors) for flight conditions at that instance, the SMS 16 algorithm(s) produces a code or set of codes corresponding to a desired pitch setting of the store 12. The code is transmitted to the VPVC 94 which then causes the servo-motor 84 to translate the mandrel 64 to the optimum orifice 54 setting. Optionally, when the VPVC 94 is powered up, a calibration procedure may occur wherein the VPVC 94 will command the servo-motor 84 to translate the mandrel 64 to one of the closed positions as shown in FIG. 5 or 6.

Once the closed position is reached, the servo-motor 84 stalls causing the current sensor 100 illustrated in FIG. 8 to indicate to the FPGA 96 that an over-current condition is occurring and indicating to the VPVC 94 that a stop condition of the mandrel 64 has been reached. The VPVC 94 may then cause the servo-motor 84 to rotate until the mandrel 64 reaches the closed position on an opposite side of the mandrel bore 52 while the position sensors 88 (e.g., Hall effect sensors 90 and/or optical encoder 92) count the number of revolutions required to reach the opposite closed position. Upon verification that both position sensors 88 are in substantial agreement with one another, the servo-motor 84 recalibrates the mandrel 64 by translating the mandrel 64 to the neutral position as illustrated in FIG. 4.

From the neutral position, the VPVC 94 then commands the servo-motor 84 to move the mandrel 64 to the optimum orifice 54 setting as represented by the code received from the SMS 16. The optimum pitch setting may be initiated and confirmed as part of the store ejection process. Once the mandrel 64 is positioned within the bore 52 at the optimum orifice 54 setting, the store ejector 10 may be sent a store release command which activates a solenoid connected to the dump valve 108 shown in FIG. 3. Upon opening of the dump valve 108, pressurized gas flow from the accumulator bottle 104 into the housing 48 of the orifice assembly 46.

As shown in FIG. 3, the pressurized gas forces the release piston 116 downwardly causing the hooks 126 to open and releasing the store 12. The downwardly-forced release piston 116 then allows pressurized gas to flow into the inlet port 56 of the orifice assembly 46. The pressurized gas enters the bore 52 and passes through the bore 52 in one or both directions in proportion to the orifice 54 exit areas defined by the position of the mandrel 64. The pressurized gas then flows into the outlet ports 60 and travels through the ejector piston conduits 62 to extend the ejector pistons 130 and forcibly eject the store 12 at the optimum pitch rate. Following release of the store 12, the store present switch 44 shown in FIG. 7 indicates an absence of the store 12 causing the CSE 132 to deactivate the store ejector 10 from further pressurization.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A store ejector for an aircraft having a flight computer configured to provide store release pitch data corresponding to aircraft flight conditions, the store ejector comprising:
   at least one pair of pneumatically activated ejector pistons;
   a pneumatic source for providing pressurized gas to the pneumatically operated ejector pistons;
   an adjustable orifice assembly including:
   a housing having a mandrel bore formed therein and including at least one inlet port and a pair of outlet ports;
   a pair of orifices disposed within the mandrel bore in spaced relation to one another;
   a mandrel slidably disposable within the bore and being axially translatable to alter the ratio of pressurized gas flow from the outlet ports and into the ejector pistons; and
   a drive mechanism operatively coupled to the mandrel and being configured to axially translate the mandrel; and
   a variable pitch valve controller configured to receive the store release pitch data from the flight computer and command the drive mechanism to move the mandrel to an optimum orifice setting corresponding to the store release pitch data;

wherein the mandrel comprises:
a pair of tapered portions; and
a necked portion interconnecting the tapered portions; and
wherein each one of the tapered portions is configured to cooperate with an adjacent one of the orifices to collectively define an orifice setting, the mandrel being axially translatable such that the tapered portions are movable relative to the orifices to alter the ratio of pressurized gas flow therebetween.

2. The store ejector of claim 1 further comprising:
a means for sensing the position of the mandrel within the bore, the means for sensing being in communication with the valve controller.

3. The store ejector of claim 1 wherein the orifice assembly further includes a release mechanism slidably disposed within the housing and configured to be actuated by the pressurized gas.

4. The store ejector of claim 1 wherein the pneumatic source further includes an accumulator for storing the pressurized gas and a dump valve configured to be actuated by the valve controller upon positioning of the mandrel at the optimum orifice setting.

5. The store ejector of claim 1, wherein said ejector being fluidly connected to said pneumatic source configured to provide pressurized gas to the orifice assembly such that the flow thereof through the orifices is apportioned to the ejector pistons.

6. The store ejector of claim 5 wherein the pneumatic source is configured as at least one of the following: an on-board compressor, a pressure vessel.

7. The store ejector of claim 5, wherein the pneumatic source is configured as a pyrotechnic device.

8. The store ejector of claim 1, wherein: the drive mechanism is configured as a servo-motor threadably engageable to one end of the mandrel; the mandrel being non-rotatably fixed to the housing such that rotation of the servo-motor causes axial translation of the mandrel relative to the bore.

9. The store ejector of claim 1, further comprising: a means for sensing the position of the mandrel within the bore, the means for sensing being in communication with the valve controller.

10. The store ejector of claim 9, wherein the means for sensing is a position sensor that is configured as at least one of an optical sensor and a Hall effect sensor.

11. The store ejector of claim 1, wherein at least one of the exit ports extends from the bore at an acute angle.

12. The store ejector of claim 1 wherein said at least one pair of pneumatically activated ejector pistons includes at least one pair of forward and aft ejector pistons; the orifice assembly being configured to alter the ratio of pressurized gas flow to the forward and aft ejector pistons of the store ejector such that the pitch of the store is varied.

13. A method of in-flight adjustment of a store ejector orifice assembly for an aircraft, the method comprising the steps of:
providing a store ejector comprising:
at least one pair of pneumatically activated ejector pistons;
a pneumatic source for providing pressurized gas to the pneumatically operated ejector pistons;
an adjustable orifice assembly including:
a housing having a mandrel bore formed therein and including at least one inlet port and a pair of outlet ports;
a pair of orifices disposed within the mandrel bore in spaced relation to one another;
a mandrel slidably disposable within the bore and being axially translatable to alter the ratio of pressurized gas flow from the outlet ports and into the ejector pistons; and
a drive mechanism operatively coupled to the mandrel and being configured to axially translate the mandrel;
a variable pitch valve controller configured to receive the store release pitch data from the flight computer and command the drive mechanism to move the mandrel to an optimum orifice setting corresponding to the store release pitch data;
wherein the mandrel comprises:
a pair of tapered portions; and
a necked portion interconnecting the tapered portions; and
wherein each one of the tapered portions is configured to cooperate with an adjacent one of the orifices to collectively define an orifice setting, the mandrel being axially translatable such that the tapered portions are movable relative to the orifices to alter the ratio of pressurized gas flow therebetween;
obtaining flight conditions of the aircraft;
determining optimum orifice settings corresponding to the aircraft flight conditions; and
adjusting the orifices in accordance with the optimum orifice settings.

14. The method of claim 13 wherein:
the flight conditions are obtained from an aircraft flight computer;
the optimum orifice settings being determined by a computer program executed on the aircraft computer; and
the orifice settings being adjustable using a servo-motor.

15. The method of claim 13 further comprising the steps of:
calibrating the mandrel position; and
translating the mandrel to a neutral position within the bore prior to translating the mandrel to the optimum orifice settings.

16. The method of claim 13 further comprising the step of deriving a set of store separation pitch settings based on aircraft type for a plurality of flight conditions, each one of the pitch settings corresponding to an optimum orifice setting.

17. The method of claim 13 further comprising the step of:
releasing a store from the store ejector;
wherein the steps are performed in at least one of real-time and near real-time.

* * * * *